(12) United States Patent
Wang et al.

(10) Patent No.: US 10,762,722 B2
(45) Date of Patent: Sep. 1, 2020

(54) APPARATUS FOR SHARING OBJECTS OF INTEREST AND ASSOCIATED METHODS

(71) Applicant: Nokia Technologies Oy, Espoo (FI)

(72) Inventors: Tinghuai Wang, Tampere (FI); Lixin Fan, Tampere (FI); Yu You, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/309,015

(22) PCT Filed: Jun. 12, 2017

(86) PCT No.: PCT/FI2017/050433
§ 371 (c)(1),
(2) Date: Dec. 11, 2018

(87) PCT Pub. No.: WO2018/002419
PCT Pub. Date: Jan. 4, 2018

(65) Prior Publication Data
US 2019/0311548 A1 Oct. 10, 2019

(30) Foreign Application Priority Data
Jun. 28, 2016 (EP) ..................................... 16176705

(51) Int. Cl.
*G06T 15/50* (2011.01)
*G06T 15/80* (2011.01)
(Continued)

(52) U.S. Cl.
CPC ................ *G06T 19/20* (2013.01); *G06T 7/73* (2017.01); *G06T 15/506* (2013.01); *G06T 15/80* (2013.01);
(Continued)

(58) Field of Classification Search
CPC ....... G06T 15/506; G06T 15/80; G06T 19/20; G06T 2219/024; G06T 2219/2012; G06T 7/73
See application file for complete search history.

(56) References Cited

U.S. PATENT DOCUMENTS 5,821,925 A 10/1998 Carey et al.
8,401,225 B2 3/2013 Newcombe et al.
(Continued)

FOREIGN PATENT DOCUMENTS

EP 3112985 A1 1/2017
EP 3128413 A1 2/2017
(Continued)

OTHER PUBLICATIONS

Merabti et al., "Virtual Environments with Content Sharing", International Conference on Technologies for E-Learning and Digital Entertainment, vol. 5093, 2008, pp. 328-342.
(Continued)

*Primary Examiner* — Sing-Wai Wu
(74) *Attorney, Agent, or Firm* — Alston & Bird LLP (57) ABSTRACT

An apparatus configured to, in respect of first and second virtual reality content (207, 209) each configured to provide imagery for a respective first and second virtual reality space for viewing in virtual reality; and based on first-user-viewing-experience information defining an appearance of an object of interest (205) that appears in the first virtual reality content as viewed, in virtual reality, by a first user (201), and defining a time-variant point of view from which the first user (201) viewed the object of interest (205); providing for display to a second user (202), the second user provided with a virtual reality view of the second virtual reality content (203), of imagery of the object of interest (204) superimposed into the virtual reality space of the second virtual reality content (203) such that the second user
(Continued)

(202) is able, while viewing the second virtual reality content, to witness the object of interest (204) as it was viewed by the first user (201).

20 Claims, 3 Drawing Sheets (51) Int. Cl.
*G06T 19/20* (2011.01)
*G06T 7/73* (2017.01)
*G06T 19/00* (2011.01)

(52) U.S. Cl.
CPC ........ *G06T 19/00* (2013.01); *G06T 2219/024* (2013.01); *G06T 2219/2012* (2013.01)

(56) References Cited

U.S. PATENT DOCUMENTS

| | | |
|---|---|---|
| 8,836,771 B2 | 9/2014 | Strong |
| 9,137,511 B1 | 9/2015 | LeGrand, III et al. |
| 9,363,569 B1* | 6/2016 | van Hoff ............ H04N 21/2668 |
| 9,839,037 B2 | 12/2017 | Lo et al. |
| 2004/0140994 A1 | 7/2004 | Choi et al. |
| 2009/0102858 A1 | 4/2009 | Eggers et al. |
| 2015/0058102 A1* | 2/2015 | Christensen ......... H04N 13/189 705/14.6 |
| 2015/0178990 A1 | 6/2015 | Ng-Thow-Hing et al. |
| 2015/0348327 A1 | 12/2015 | Zalewski |
| 2016/0093108 A1 | 3/2016 | Mao et al. |
| 2018/0219975 A1 | 8/2018 | Leppanen et al. |
| 2019/0051055 A1 | 2/2019 | Leppanen et al. |

FOREIGN PATENT DOCUMENTS

| | | |
|---|---|---|
| EP | 3190503 A1 | 7/2017 |
| EP | 3206122 A1 | 8/2017 |
| WO | 2015/077591 A1 | 5/2015 |
| WO | 2015/126643 A2 | 8/2015 |
| WO | 2016/029224 A1 | 2/2016 |

OTHER PUBLICATIONS

Extended European Search Report received for corresponding European Patent Application No. 16176705.8, dated Dec. 22, 2016, 9 pages.

International Search Report and Written Opinion received for corresponding Patent Cooperation Treaty Application No. PCT/FI2017/050433, dated Aug. 23, 2017, 13 pages.

Office Action for European Application No. 16 176 705.8 dated Mar. 12, 2020, 5 pages.

* cited by examiner

700 — based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a predetermined time;

701 — provide for display to a second user, the second user provided with a virtual reality view of the second virtual reality content, of imagery of the object of interest superimposed into the virtual reality space of the second virtual reality content such that the second user is able to witness the object of interest as it was viewed by the first user while viewing the second virtual reality content wherein the apparatus is caused to provide for at least one of; movement of a point of view of a virtual reality view provided to the second user equivalent to the time-variant point of view of the first user; and movement of the imagery of the object of interest based on the time-variant point of view such that the movement of the object of interest creates an equivalent change in appearance of the object of interest so that the view of the object of interest is substantially the same to both the first and second users.

Figure 8

APPARATUS FOR SHARING OBJECTS OF INTEREST AND ASSOCIATED METHODS

RELATED APPLICATION

This application was originally filed as Patent Cooperation Treaty Application No. PCT/FI2017/050433 filed Jun. 12, 2017 which claims priority benefit to EP Patent Application No. 16176705.8, filed Jun. 28, 2016.

TECHNICAL FIELD

The present disclosure relates to the field of virtual reality and, in particular, to the display of imagery of an object of interest to a second user that was viewed by a first user. Associated methods, computer programs and apparatus is also disclosed. Certain disclosed aspects/examples relate to portable electronic devices.

BACKGROUND

Virtual reality may use a headset, such as glasses or goggles, or one or more displays that surround a user to provide the user with an immersive virtual experience. A virtual reality apparatus may present multimedia virtual reality content representative of a virtual reality space to a user to simulate the user being present within the virtual reality space. The virtual reality space may be provided by a panoramic video, such as a video having a wide or 360° field of view (which may include above and/or below a horizontally oriented field of view). A user may be able to explore the virtual reality space and view objects from different points of view.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code, the at least one memory and the computer program code configured to, with the at least one processor, cause the apparatus to perform at least the following:
  in respect of first and second virtual reality content each configured to provide imagery for a respective first and second virtual reality space for viewing in virtual reality; and
  based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a predetermined time;
  provide for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

In one or more embodiments, the apparatus is caused to provide for display of the object of interest with an appearance consistent with the information that defines the time-variant point of view by at least one of;
  movement of a point of view of a virtual reality view provided to the second user equivalent to the time-variant point of view of the first user; and
  image manipulation of the imagery of the object of interest based on the time-variant point of view such that the image manipulation of the object of interest creates an equivalent change in appearance of the object of interest so that the view of the object of interest is substantially the same to both the first and second users.

In one or more embodiments, the imagery of the object of interest is provided by a virtual 3-dimensional model of the object of interest rendered in the second virtual reality space based on the information that defines the time-variant point of view to thereby enable the second user to witness the object of interest as it was viewed by the first user.

In one or more examples, the first-user-viewing-experience information may include a plurality of coordinates indicative of the position in the first virtual reality space of the time-variant point of view to define the movement of the point of view of the first user over the predetermined time period. In one or more examples, the plurality of coordinates are translated to coordinates of the second virtual reality space based on the current location of the second user in the second virtual reality space such that the imagery of the object of interest may be displayed to recreate the appearance of the object of interest as viewed by the first user.

In one or more embodiments, the apparatus is caused to provide for modulation of one or more of;
  movement of the point of view of the virtual reality view provided to the second user; and
  movement of the imagery of the object of interest;
  in accordance with user input of the second user, the user input configured to change one or more of a viewing direction of virtual reality view and a point of view of the virtual reality view in the virtual reality space.

In one or more embodiments, the imagery of the object of interest is isolated from background imagery appearing around the object of interest in the first virtual reality content as viewed by the first user.

In one or more examples, the virtual reality content includes one or more of;
  video imagery and depth information of a scene presented in the video imagery such that one or more objects appearing in the video imagery may be isolated from surrounding imagery; and
  a 3-dimensional model of at least one object.

It will be appreciated that the 3-dimensional model of the at least one object may be a partial model. For example, only parts of an object that are capable of being viewed or were viewed by the first user may form part of the model. Further, the model may comprise an approximation of the shape of the object.

In one or more examples, the first user may define the predetermined time based on the temporal length of the viewing experience of the object of interest they wish to share.

In one or more embodiments, the first-user-viewing-experience information includes pose information defining the orientation of the object of interest in the virtual reality space of the first virtual reality content; and
  wherein the appearance of the object provided for display to the second user is defined by the pose information.

In one or more examples, the first-user-viewing-experience information includes one or more of;
  a reference to the object of interest in the first virtual reality content;
  a 3-dimensional virtual model of the object of interest; and
  imagery of the object of interest from one or more viewing directions.

Thus, in one or more examples, the reference may provide for data obtained from the first virtual reality content to be used to provide for display of the imagery of the object of interest. The reference may refer to a full or partial 3-dimensional model of the object of interest if that information forms part of the first virtual reality content. The first-user-viewing-experience information itself may include information to create the imagery of the object of interest for the second user by way of 3-D model information or imagery of the object of interest from different viewing directions that may or may not be modified to recreate the appearance of the object of interest from the time-variant points of view, for example.

In one or more embodiments, the first-user-viewing-experience information further defines movement of the object of interest in the first virtual reality space at the time it was viewed by the first user over the predetermined time; and
  wherein the apparatus is caused to provide for corresponding movement, in the second virtual reality space, of the superimposed imagery of the object of interest.

In one or more examples, the first-user-viewing-experience information may include movement information over the predetermined time, such as a series of coordinates with respect to the virtual reality space, of the object of interest, such that equivalent movement of the object of interest relative to the second user can be provided. In one or more examples, movement of the object of interest in the first virtual reality space is not reproduced when the imagery of the object of interest is provided for display to the second user.

In one or more embodiments, the first-user-viewing-experience information further defines object-appearance changes of the object of interest over the predetermined time, the object-appearance comprising changes to one or more of the shape, size, colour, outline, texture and configuration; and
  wherein the apparatus is caused to provide for corresponding object-appearance changes of the superimposed imagery of the object of interest.

In one or more examples, the object-appearance changes may be defined by one or more of;
  reference to the object of interest in the first virtual reality content at a time point corresponding to the predetermined time that the first user viewed the object of interest;
  changes to one or more of the shape, size, colour, outline, texture and configuration of a partial or full 3-dimensional model of the object of interest; and
  changes to images configured to be applied to a surface of a 3-dimensional model of the object of interest when rendered in the second virtual reality space.

In one or more examples, the apparatus is caused to provide for display of imagery of the object of interest superimposed into the virtual reality space of the second virtual reality content wherein one or more of;
  i) the first virtual reality content and the second virtual reality content is the same virtual reality content;
  ii) the first virtual reality content and the second virtual reality content is the same virtual reality content and the second user is located at a different virtual location within the virtual reality space compared to a virtual location of the first user when the first user viewed the object of interest that is defined by the first-user-viewing-experience information;
  iii) the first and second virtual reality content is different virtual reality content.

In one or more embodiments, the object of interest comprises is associated with a 3-dimensional model and the imagery of the object of interest superimposed in the second virtual reality space comprises one or more of;
  a 2-dimensional image generated from the 3-dimensional model of the object of interest based on the information defining the time-variant point of view of the first user at the time the first user viewed the object of interest; and
  a 3-dimensional model oriented in the second virtual reality space in accordance with the information defining the time-variant point of view such that the second user views the object of interest from the same point of view as the first user.

In one or more embodiments, the first-user-viewing-experience information includes information to at least identify a 3-dimensional model of the object of interest and visual information indicative of one or more of;
  a configuration of a mesh that defines the 3-dimensional model;
  one or more graphical textures comprises images that are rendered over a surface of the 3-dimensional model;
  lighting information comprising information of how the 3-dimensional model of the object of interest was illuminated in the first virtual reality space;
  and wherein the imagery of the object of interest provided for display to the second user is provided by a 3-dimensional model displayed in accordance with the visual information.

In one or more examples, the imagery of the object of interest comprises a rendering of a 3-dimensional model of the object of interest placed in the virtual reality space with a virtual location and orientation based on the point of view of the first user such that relative to the virtual location and the orientation of the second user, the object of interest is presented in the same manner as it was to the first user at least in terms of its pose.

In one or more embodiments, when the imagery of the object of interest is provided for display to the second user the apparatus is caused to provide for a visual effect to be applied such that one or more of;
  a colour of the imagery of the object of interest is different to how it was presented to the first user;
  shading of the imagery of the object of interest is different to how it was presented to the first user; and
  an outline of the imagery of the object of interest is different to how it was presented to the first user; and
  the virtual reality view of the second virtual reality content surrounding the imagery of the object of interest is displayed differently to how it was presented prior to display of the imagery of the object of interest;

to thereby distinguish between the second user viewing the second virtual reality content without the imagery of the object of interest and with the imagery of the object of interest.

In one or more examples the visual effect thereby enables the second user to distinguish between an object appearing in the second virtual reality content and an object of interest that is displayed based on the first-user-viewing-experience information.

In one or more embodiments, the first-user-viewing-experience information is generated based on one or more of;

the first user providing a user input to share how they viewed the object of interest;

a selection, by the first user, of the object of interest from one or more objects that are visible to them in the first virtual reality content.

In a second aspect there is provided an apparatus comprising:

at least one processor; and at least one memory including computer program code, the at least one memory and the computer program code configured to, with the at least one processor, cause the apparatus to perform at least the following:

in respect of first virtual reality content configured to provide imagery for a respective first virtual reality space for viewing in virtual reality; and based on a time-variant point of view in the first virtual reality space, relative to an object of interest, and from which a first user viewed the object of interest over a predetermined time, the object of interest appearing in the first virtual reality content as viewed, in virtual reality, by the first user;

provide for generation of first-user-viewing-experience information defining an appearance of the object of interest and defining the time-variant point of view from which the first user viewed the object of interest, the first-user-viewing-experience information usable for providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

It will be appreciated that the optional features described herein in relation to the first aspect that relate to information present in the first-user-viewing-experience information are applicable to the second aspect in respect of generation of the first-user-viewing-experience information.

In a third aspect there is provided a method, the method comprising;

in respect of first and second virtual reality content each configured to provide imagery for a respective first and second virtual reality space for viewing in virtual reality; and based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a predetermined time;

providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

In a fourth aspect there is provided a computer readable medium comprising computer program code stored thereon, the computer readable medium and computer program code being configured to, when run on at least one processor, perform the method of:

in respect of first and second virtual reality content each configured to provide imagery for a respective first and second virtual reality space for viewing in virtual reality; and based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a predetermined time;

providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

In a further aspect there is provided an apparatus, the apparatus comprising means configured to;

in respect of first and second virtual reality content each configured to provide imagery for a respective first and second virtual reality space for viewing in virtual reality; and based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a predetermined time;

provide for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

In a further aspect there is provided a method, the method comprising:
in respect of first virtual reality content configured to provide imagery for a respective first virtual reality space for viewing in virtual reality; and
based on a time-variant point of view in the first virtual reality space, relative to an object of interest, and from which a first user viewed the object of interest over a predetermined time, the object of interest appearing in the first virtual reality content as viewed, in virtual reality, by the first user;
providing for generation of first-user-viewing-experience information defining an appearance of the object of interest and defining the time-variant point of view from which the first user viewed the object of interest, the first-user-viewing-experience information usable for providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

In a fourth aspect there is provided a computer readable medium comprising computer program code stored thereon, the computer readable medium and computer program code being configured to, when run on at least one processor, perform the method of:
in respect of first virtual reality content configured to provide imagery for a respective first virtual reality space for viewing in virtual reality; and
based on a time-variant point of view in the first virtual reality space, relative to an object of interest, and from which a first user viewed the object of interest over a predetermined time, the object of interest appearing in the first virtual reality content as viewed, in virtual reality, by the first user;
providing for generation of first-user-viewing-experience information defining an appearance of the object of interest and defining the time-variant point of view from which the first user viewed the object of interest, the first-user-viewing-experience information usable for providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

In a further aspect there is provided an apparatus, the apparatus comprising means configured to;
in respect of first virtual reality content configured to provide imagery for a respective first virtual reality space for viewing in virtual reality; and
based on a time-variant point of view in the first virtual reality space, relative to an object of interest, and from which a first user viewed the object of interest over a predetermined time, the object of interest appearing in the first virtual reality content as viewed, in virtual reality, by the first user;
provide for generation of first-user-viewing-experience information defining an appearance of the object of interest and defining the time-variant point of view from which the first user viewed the object of interest, the first-user-viewing-experience information usable for providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

The present disclosure includes one or more corresponding aspects, examples or features in isolation or in various combinations whether or not specifically stated (including claimed) in that combination or in isolation. Corresponding means and corresponding functional units (e.g., function enabler, point of view determiner, display device, 3-dimensional model renderer, image manipulator, image effect applicator, image extractor) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Virtual reality (VR) may use a headset, such as glasses or goggles, or one or more displays that surround a user to provide a user with an immersive virtual experience. A virtual reality apparatus may present multimedia virtual reality content representative of a virtual reality space to a user to simulate the user being present within the virtual reality space. The virtual reality space may replicate a real world environment to simulate the user being physically present at a real world location or the virtual reality space may be computer generated or a combination of computer generated and real world multimedia content. The virtual reality space may be provided by a panoramic video, such as a video having a wide or 360° field of view (which may include above and/or below a horizontally oriented field of view). The virtual reality space thus provides a virtual 3-dimensional environment in which the video imagery of the VR content is provided for display. The virtual reality content may be configured such that the user may be able to change one or both of their viewing direction and virtual location within the virtual reality space so that objects appearing in the VR content can be viewed from different points of view and different viewing directions. A user may be provided with a spatial subset of the virtual reality space as their VR view, i.e. a view port to view the video imagery of the VR space. The virtual reality apparatus may provide for user interaction with the virtual reality space displayed. The virtual reality apparatus may or may be provided with information to identify objects appearing in the video imagery. For example, depth information from virtual reality content capture devices used to capture the video imagery may enable objects to be selected or "isolated" from the remaining imagery. In one or more examples, image based object recognition may be used to identify objects in the video imagery. In one or more examples, the virtual reality content may be computer generated from a virtual model and therefore the objects appearing in the virtual reality space may be readily identifiable. The virtual reality content provided to the user may comprise live or recorded images of the real world, captured by a virtual reality content capture device. One example of a virtual reality content capture device is a Nokia OZO camera. The virtual reality space may provide a 360° or more field of view and may provide for panning/rotating around said field of view based on movement of the VR user's head or eyes. The virtual reality view of a virtual reality space may be provided to said user by virtual reality apparatus via displays in the headset. The virtual reality space may appear to the user of the VR apparatus as a three dimensional space created from images of the virtual reality content. Thus, the VR content may comprise images taken in multiple viewing directions that can be displayed and arranged together to form an (e.g. uninterrupted, continuous) wrap around field of view.

Virtual reality content may, by its nature, be immersive and, particularly when the virtual reality space is explorable, users may notice objects appearing in the content from different viewpoints. In some circumstances in order to notice a particular feature of an object or an occurrence related to the object, it may be that the object has to be viewed from a particular angle or point of view. It is difficult for a first user to convey their viewing experience of the object to a second user so they can witness the object in the same way. Also, the first user may want to share their viewing experience with the second user while the second user is enjoying the same virtual reality content but is at a different virtual location or time in the virtual reality content. The second user may be watching other virtual reality content. It may be bothersome and disorientating for the second user's virtual reality view to be interrupted to be shown a "replay" of what the first user witnessed. It is difficult to maintain the continuity of the VR viewing experience for the second user while sharing VR viewing experiences.

Figure 1:
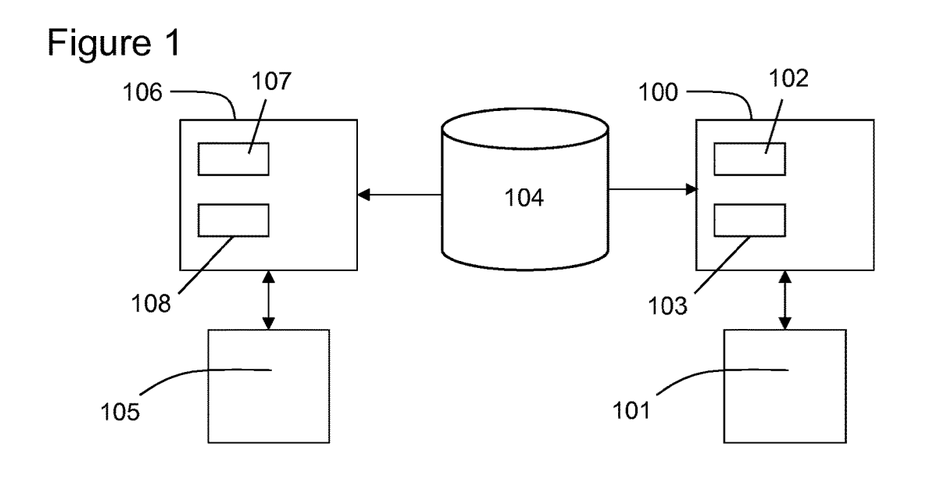
FIG. 1 illustrates an example embodiment of the apparatus along with a virtual reality apparatus.
Figure 2:
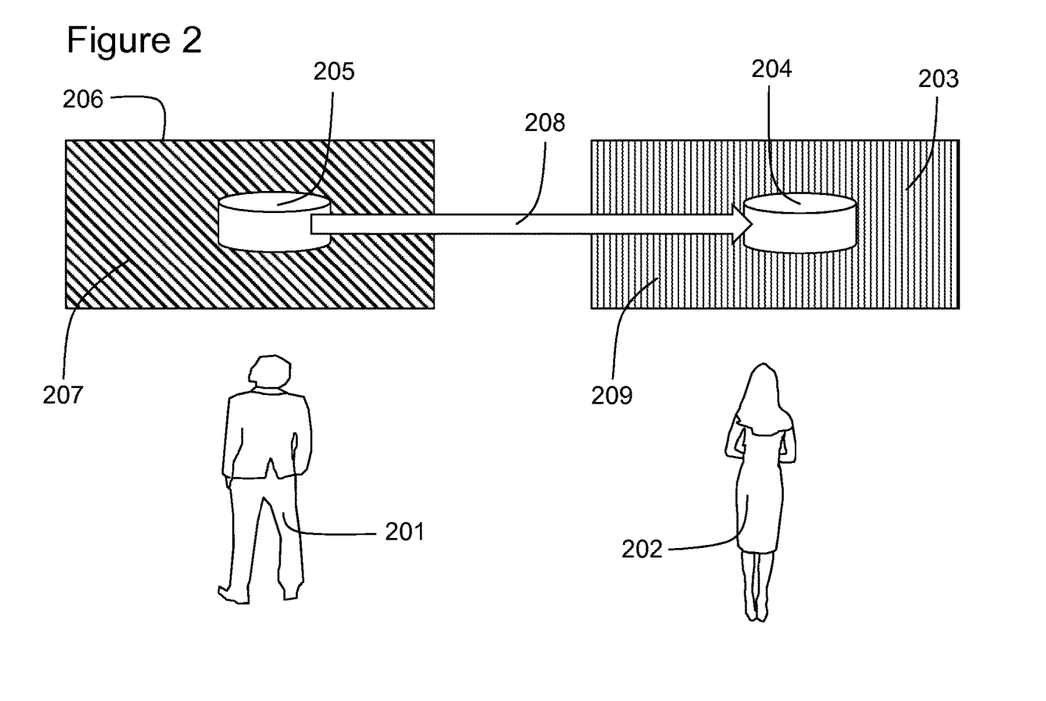
FIG. 2 illustrates an example sharing of a view of an object of interest between different virtual reality views of first and second users.

With reference to FIG. 1 and FIG. 2, an apparatus 100 is shown configured to provide for display to a second user 202, the second user 202 provided with a virtual reality view 203 of the second virtual reality content, of imagery of an object of interest 204 superimposed into a virtual reality space of second virtual reality content shown in their virtual reality view 203. The display of the imagery of the object of interest 204 is based on first-user-viewing-experience information defining the appearance of the object of interest 205 that appears in first virtual reality content as viewed, in virtual reality, by a first user 201. Thus, the first user 201 may watch first virtual reality content by way of a virtual reality view 206 provided to them of the first virtual reality content. The first user 201 may view an object in the first VR content that they deem interesting (therefore termed the object of interest 205). The view that the first user 201 had of the object of interest, which includes changes in the point of view from which they viewed the object of interest 205, may be termed a viewing experience of the object of interest. The first user 201 may wish to share this viewing experience with other users, such as the second user 202. In one or more examples, the first-user-viewing-experience information comprises information that defines the viewing experience of the first user so that the viewing experience can be witnessed by the second user 202 while they view second virtual reality content. In particular, the first-user-viewing-experience information at least defines a time-variant point of view in a first virtual reality space relative to the object of interest, from which the first user viewed the object of interest, over a predetermined time. The predetermined time may define the temporal length of the viewing experience the first user wishes to share. Accordingly, FIG. 2 shows the first virtual reality view 206 provided to the first user with first background imagery 207 and the object of interest 205. FIG. 2 further shows the action of sharing that viewing experience, metaphorically shown by arrow 208, wherein the second user 202 is presented with their virtual reality view with potentially different background imagery 209 and with imagery 204 of the object of interest superimposed therein. The object of interest may be separated from its background imagery substantially around a perimeter of the object of interest.

The apparatus 100 may be part of a virtual reality device 101 configured to present virtual reality content to the second user 202. The virtual reality device 101 may present a VR view of a VR space to a user via a VR display, which may comprise a headset. The VR view provided to the second user on the VR display may be based on the orientation of the VR display, such that a user can look around the VR space by moving their head. It will be appreciated that other types of display and other means to "look around" the virtual reality space may be provided. In some examples, the apparatus 100 is functionally provided by a computer, the virtual reality device 101 or a computer server, each of which may comprise a memory 102 and a processor 103, although in other examples the apparatus 100 may be an electronic device, such as a computer, mobile telephone or other apparatus as listed hereinafter in communication with the VR device 101. The virtual reality device 101, in this example, is configured to receive virtual reality content from a virtual reality content store 104 where virtual reality content is stored (which may include being stored transiently or temporarily). Thus, the virtual reality content may be live content and the store 104 may be a memory or buffer of a display or onward transmission path. The apparatus 100 may receive indications of where the second user is looking and their virtual location in the virtual reality space. This data may be provided by the VR apparatus 101 or a different apparatus.

A VR apparatus 105 similar to VR apparatus 101 is shown for providing the first user 201 with their VR view 206 of the first virtual reality content. In this example, the VR apparatus 105 may retrieve the first VR content from the content store 104, which may represent a network (such as Internet) based store. It will be appreciated that the VR apparatus 105 may source the VR content it provides to the first user 201 from a different content store. A first-user-viewing-experience information generation apparatus 106 is shown connected to the VR apparatus 105. Similar to the apparatus 100, the apparatus 106 may form part of the VR apparatus 105 or may be provided by any apparatus or device in communication with the VR apparatus 105. The apparatus 105 may, such as in response to user input of the first user 201 generate the first-user-viewing-experience information based on a selected object of interest appearing in the first virtual reality content. Accordingly, the first user 201 may identify or select an object of interest and may select a time period over which they wish to share their viewing experience. In other examples the object may be selected automatically and/or the time period may be determined automatically. The apparatus 106 may by way of communication with the VR apparatus 105 (to obtain viewing directions/point of view of the VR view 206 relative to the object of interest, for example) and the first VR content watched by the first user (to obtain at least a reference to the object of interest in the first VR content or a full or partial model of the object of interest, for example) generate the first-user-viewing-experience information. That first-user-viewing-experience information may be passed, by way of signalling, to the apparatus 100 for providing for display of the imagery of the object of interest 204. It will be appreciated that the first-user-viewing-experience information may be stored and used at a later time by one or more second users.

In this embodiment the apparatus 100 and/or apparatus 106 (or other electronic device) mentioned above may have only one processor 103, 108 and one memory 102, 107 but it will be appreciated that other embodiments may utilise more than one processor and/or more than one memory (e.g. same or different processor/memory types). Further, the apparatus 100, 106 may be an Application Specific Integrated Circuit (ASIC). It will be appreciated that the apparatus 100 and 106 are, in terms of their hardware configuration, independent of one another.

The processor may be a general purpose processor dedicated to executing/processing information received from other components, such as from content store 104 and the respective VR apparatuses 101, 105 in accordance with instructions stored in the form of computer program code in the memory. The output signalling generated by such operations of the processor is provided onwards to further components, such as the apparatus 100 or the VR apparatus 101 for display of relevant imagery.

The memory 102, 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

Figure 3:
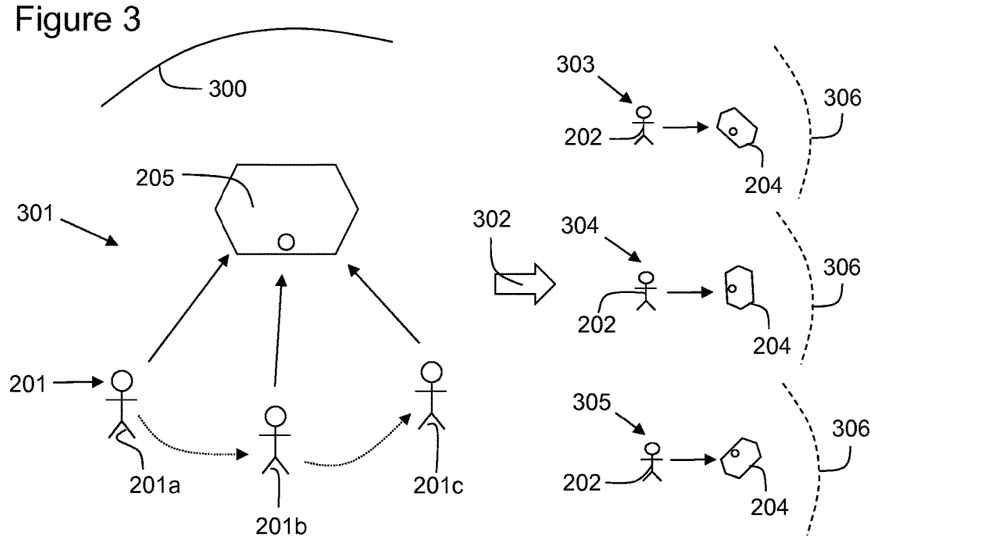
FIG. 3 illustrates an overview of the how an object of interest is viewed by a first user and how it is provided for display to a second user.

FIG. 3 shows an example plan view of the first user 201 viewing an object of interest (OOI) 205 in the first virtual reality content they are watching. The OOI 205 may be presented as an object in the foreground with other imagery of the first virtual reality content forming a background 300. The first user's point of view is changing over time as they view the object of interest 205. In this example, three locations of the first user 201*a-c* are shown. Thus, the first user 201 begins at virtual position 201*a* in the first virtual reality space 301 and has a first point of view of the OOI 205 at time t1. Then the first user moves to position 201*b* in the virtual reality space 301 at time t2 and therefore has a different point of view of the OOI 205. The first user then moves to position 201*c* in the virtual reality space 301 at time t3 and therefore has a further different point of view of the OOI 205. The view of the object of interest 205 and in particular its appearance from the points of view at positions 201*a*, 201*b* and 203*c* may form a viewing experience that the first user 201 wishes to share. Accordingly, the viewing experience temporally extending for a predetermined time from time t1 to t3, may be reproduced for a different user. Information defining the change in the point of view at positions 201*a*, 201*b*, 201*c* at times t1, t2, t3 relative to the OOI 205 may form part of the first-user-viewing-experience information. In this example, the coordinates of the position of the user's point of view in the first virtual reality space 301 and the position of the OOI 205 in the first virtual reality space 301 is determined. These coordinates or coordinates derived therefrom may form part of the first-user-viewing-experience information. If the OOI is a 3-dimensional model or has 3-dimensional information associated therewith (such as from depth information from VR content capture devices capturing the video imagery in which the OOI is present), the pose of the OOI 205 may be determined. The pose may define the orientation of the 3-dimensional model of the OOI in the virtual reality space (which may change over the predetermined time). In one or more examples, the direction of the point of view at each position 201*a-c* may be determined. From some or all of the point of view position information, pose information and viewing direction information, how the OOI 205 appeared to the first user in terms of the direction and distance it was viewed from by the first user may be recreated for the second user. In one or more examples, imagery of the object of interest forms part of the first-user-viewing-experience information so that a view of the OOI can be recreated based on imagery (visually modified or not) rather than or in addition to rendering of a 3-dimensional model with equivalent point of view/viewing direction changes. Thus, how the appearance of the object of interest is defined in the first-user-viewing-experience information depends on what form the first virtual reality content takes and how the object is identified therein.

Arrow 302 shows metaphorically the first-user-viewing-experience information being utilised by the second user 202. Three snapshots 303, 304 and 305 of a plan view of the virtual reality space provided to the second user via their virtual reality view at three different times is shown on the right hand side of FIG. 3. The second user 202 is viewing second virtual reality content and therefore different background imagery 306 (shown by dashed lines to distinguish from the solid line 300 representing the background of the first virtual reality content) is provided for display by the VR apparatus 101. It will be appreciated that the second virtual reality content and the first virtual reality content may be the same content in terms of the imagery it contains or, put another way, the "virtual world" it defines. For example, the second user may be at a same/different virtual time or same/different virtual location in the virtual reality space created from the same virtual reality content. In one or more examples the second virtual reality content may be different virtual reality content in terms of the imagery it contains or, put another way, the "virtual world" it defines.

In this example, the object of interest 205 is separated from the background 300 and imagery thereof is superimposed into the virtual reality space of the second virtual reality content. Thus, the imagery of the object of interest from the first virtual reality content is viewed by the second user with the background 306 (and any foreground objects present in the second virtual reality content) from of the second virtual reality content. Thus, the second user 202 experiences continuity in their viewing experience as they perceive they are still viewing the second virtual reality content but the imagery 204 of the object of interest is superimposed into their VR view. This may reduce disorientation or bemusement when viewing the viewing experience of the first user 201.

In this example, while the changes in the point of view of the first user 201 provided for the different viewing directions from which the OOI 205 was viewed and therefore altered how it appeared, when the imagery 204 of the OOI is provided for display to the second user, the point of view of the second user may not be changed. Instead, or in combination with changes in the point of view, the change in appearance of the object of interest due to the changes of the point of view of the first user is translated into movement, typically rotation and/or translation, of the imagery 204 of the object of interest. Thus, in the snapshots 303, 304, 305, the imagery of the object of interest is moved or rotated in the virtual reality space based on the time-variant point of view (at positions 201a, 202b, 202c) such that the movement (e.g. rotation) of the object of interest creates an equivalent change in appearance of the imagery 204 of the object of interest. Accordingly, whether the view of the second user moves or the imagery of the object of interest moves, the second user receives a view of the object of interest that is substantially the same to both the first 201 and second 202 users. In snapshot 303, the angle from which the imagery 204 of the object of interest is displayed is equivalent to the first user's point of view at time t1 at position 201a. In snapshot 304, the angle from which the imagery 204 of the object of interest is displayed is equivalent to the first user's point of view at time t2 at position 201b. In snapshot 305, the angle from which the imagery 204 of the object of interest is displayed is equivalent to the first user's point of view at time t3 at position 201c. Thus, while the first user 201 achieved the viewing experience of the OOI 204 by translation and rotation of their point of view (shown as 201a-c), the second user 202 is provided with equivalent movement, i.e. manipulation of the imagery of the object of interest, to recreate the viewing experience of the object of interest.

In one or more embodiments, the point of view of the second user 202 may be moved in accordance with the time-variant changes of the first user while the imagery of the object of interest 205 is not moved. In one or more embodiments, a combination of the point of view of the second user 202 and the imagery of the object of interest 205 may be moved to create a combined movement in accordance with the time-variant changes of the first user so that the first user and second user view substantially the same viewing experience of the object of interest.

Figure 4:
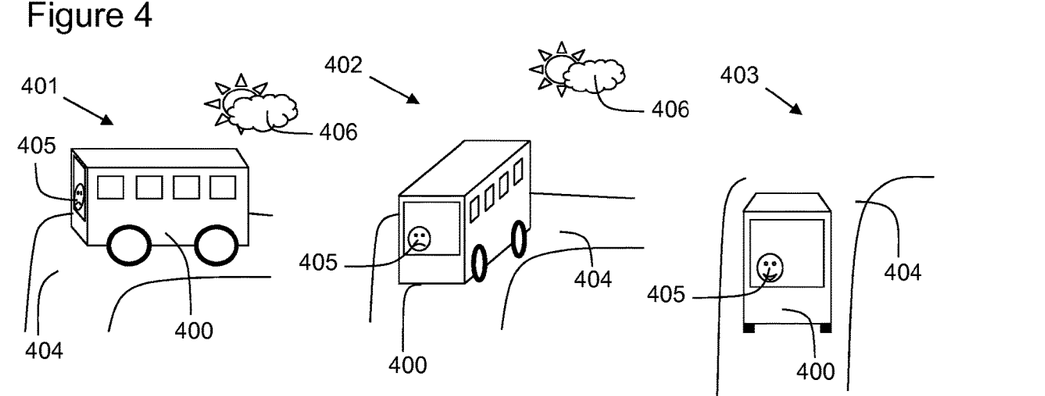
FIG. 4 illustrates a series of images showing the appearance of an object of interest as viewed by a first user.
Figure 5:
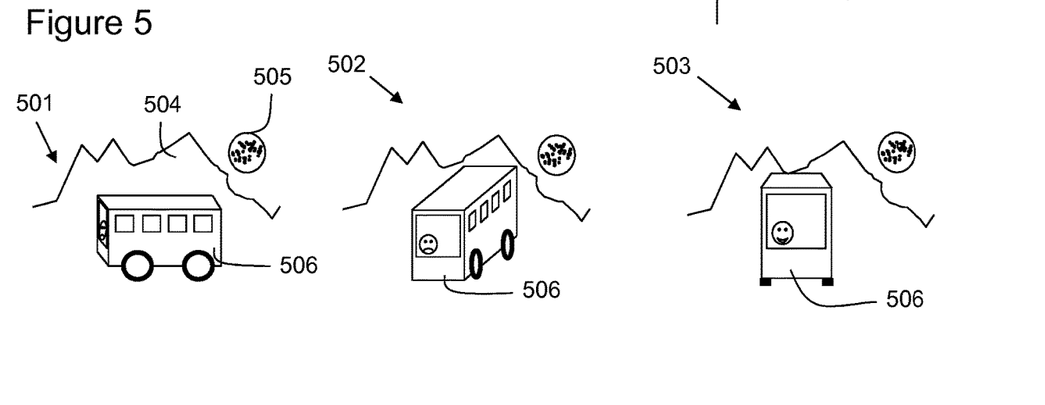
FIG. 5 illustrates a series of images showing the display of the object of interest superimposed into a virtual reality view of a second user.

FIG. 4 shows three different VR views 401, 402, 403 provided to a first user over time watching first virtual reality content. In this example, the object of interest is the bus 400. FIG. 5 shows three different VR views 501, 502, 503 provided to a second user over time watching second virtual reality content where the viewing experience of watching the bus has been superimposed.

In FIG. 4, the bus 400 is shown travelling along a road 404 and turning a corner. Thus, the bus 400 is moving in the virtual reality space. Further, the expression of the driver 405 of the bus changes over time over the three VR views. Further, the viewing direction of the VR view of the first user changes over time (moves downward), as can be noticed by the sun and cloud 406 moving up out of shot in the three VR views 401-403.

The first user may wish to share their viewing experience of the bus 400 navigating the corner and the driver smiling. Accordingly, the first user may provide a user input to select the bus 400 as the object of interest. The user input may be via a smartphone, user interface of the VR apparatus 105 or by way of a sight command or any other input suitable for "selection" of the object. The apparatus 106 or the VR apparatus 105, may use depth information of the scene or predetermined 3-dimensional models of objects in the VR content or image based object recognition to select the bus from the background imagery (i.e. the road 404 and sun and clouds 406). The apparatus 106 may provide for generation of first-user-viewing-experience information that may define the movement of the bus 400 in the virtual reality space, the movement of the viewing direction and changes to any imagery over time. For example, the first-user-viewing-experience information may define the changes in viewing direction and at least refer to a 3-dimensional model of the bus 400 (which may be predetermined or from depth information captured by the VR content capture devices). If the first-user-viewing-experience information references a period of time in the first virtual reality content, then the imagery of the object of interest can be extracted from the first virtual reality content for display to the second user with any surface imagery inherently extracted therewith. If the first-user-viewing-experience information comprises a 3-dimensional model of the bus 400, such as a virtual wireframe mesh model, it may also contain surface imagery, extracted from the first virtual reality content, for rendering over a surface of the 3-dimensional model. The surface imagery (also referred to as "textures") may comprise imagery of the colour of the bus, the windows and driver 405 of the bus, for example, with the general shape of the bus defined by the model. In addition, lighting information may form part of the first-user-viewing-experience information so that the illumination of the 3-dimensional model when displayed to the second user is consistent with how it was viewed by the first user.

Referring now to FIG. 5, the second user is watching VR content of a mountain scene with mountains 504 and moon 505 visible. Imagery of the object of interest, the bus 400, is provided for display superimposed into the second user's VR view 501, 502, 503. The display of the imagery 506 of the bus 400 may be based on second user input indicative of them wanting to view the OOI 400. In one or more examples, a prompt may be provided to the second user informing them of the possibility to view a viewing experience of the first user. The prompt may include a user-selectable option that, upon actuation, causes for the display of the imagery 506. The prompt may include a text/audio/video message from the first user. In one or more examples, viewing experiences of other users or a subset of users (such as predetermined "friends" of the second user) may be received as messages that may be reviewed at a time of the second user's choosing. In one or more examples, the first-user-viewing-experience information may provide for one or more of identification of the first user to the second user, identification of the first virtual reality content, the time the first user had the viewing experience defined by the first-user-viewing-experience information. In one or more examples, the imagery 506 may be displayed automatically without prompting the second user as soon as the first user causes the generation of the first-user-viewing-experience information.

In this example, the imagery of the bus 400 is provided for display at a fixed location in the second virtual reality space. Thus, while to the first user, the bus 400 moved in the virtual reality space by way of it virtually travelling along the road 404, the bus is shown to rotate as if it is negotiating the corner but it is essentially stationary in terms of translation in the second virtual reality space. Further, the imagery of the wheels of the bus turning as well as the driver 405 smiling is shown. In this example, the point of view of the second user is altered in accordance with the changes of the first user. Thus, as with the previous example, the viewing experience of the object of interest is substantially the same for the first user and the second user.

It will be appreciated that changes in the position of the point of view of the first user may be reproduced, to the second user, as a change in the position of the point of view of the VR view of the second user or as a movement or manipulation of the imagery of the object of interest (i.e. a rotation of a model of the object of interest) or a combination thereof. Further, changes in the viewing direction of the first user may be reproduced, to the second user, as a change in the viewing direction of the VR view of the second user or as a movement or manipulation of the imagery of the object of interest or a combination thereof. Further, movement of the object of interest around the first virtual reality space may be reproduced, to the second user, as a change of the orientation or pose of the imagery of the object of interest experienced as a consequence of the movement with or without the actual translational movement of the object in the second virtual reality space.

In one or more examples, the second user may be able to view a modified version of the viewing experience by providing second user input to change the VR view or manipulate the imagery of the object interest. In particular, whichever way the viewing experience of the object of interest is reproduced (i.e. by movement of the second user's VR view or manipulation of the imagery of the object of interest) second user input may modulate how the time-variant point of view is reproduced to the second user. For example, in examples where the point of view of the VR view of the second user is moved in accordance with the movement of the point of view of the first user as defined by the first-user-viewing-experience information, the second user input may modulate (i.e. provide a degree of deviation from) said movement. The second user may therefore create a new viewing experience based on the viewing experience of the first user. Further, where the imagery of the object of interest is moved or manipulated in accordance with the movement of the point of view of the first user as defined by the first-user-viewing-experience information, the second user input may modulate (i.e. provide a degree of deviation from) said movement by way of changing one or more of the viewing direction of the VR view, the point of view VR view or the movement/manipulation of the imagery of the object of interest. Thus, using the display of the bus 400 as an example, in one or more examples, the second user input may change the point of view/viewing direction of the VR view 501, 502, 503 while in one or more other examples, the second user input may change how the imagery of the bus is "rotated" in front of the second user in the second virtual reality space. In one or more examples, the virtual location of the imagery 506 may be modifiable by the second user or initially selectable by the second user. For example, if the imagery 506 was blocking a view of some other object in the field of view of the second user 202, they may wish to move it. Further, for example, when accepting to view another user's viewing experience, they may choose a virtual location in the second virtual reality space from which to view the imagery 506, such as prior to its display. Accordingly, the second user may modulate the rotation of the bus provided to them (that reproduces the first user's viewing experience) by changing the VR view to view the side of the bus thereby creating a new viewing experience. The apparatus 100 may provide for generation of second-user-viewing-experience information defining the second user's viewing experience of the object of interest. The second-user-viewing-experience information may define a combination of the time-variant point of view in the first virtual reality space relative to the object of interest from which the first user viewed the object of interest over a predetermined time and the changes to that time-variant point of view provided by the second user.

Figure 6:
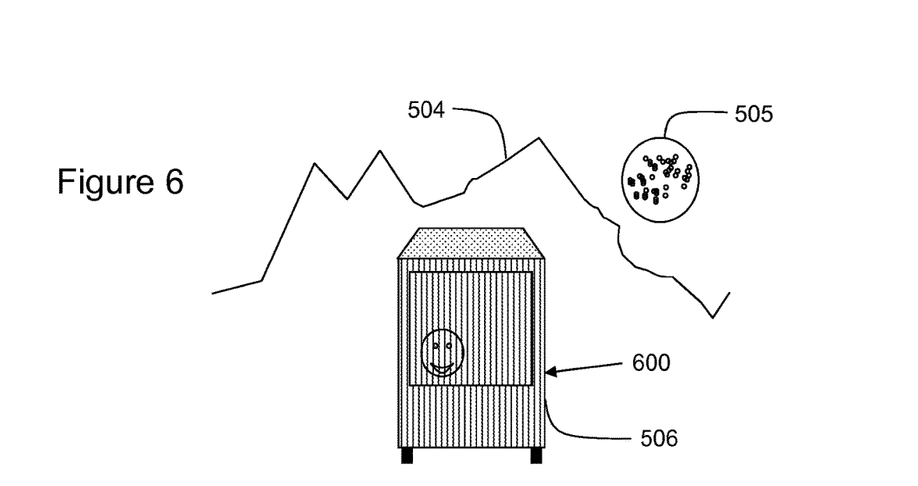
FIG. 6 illustrates a visual effect applied to the object of interest when superimposed into the virtual reality view of the second user.

FIG. 6 shows a visual effect 600 applied to the imagery 506 of the object of interest comprising shading of the imagery when it is provided for display to the second user (as shown in the third view of FIG. 5). The visual effect may assist the second user in distinguishing between objects that are originally part of the second virtual reality content and objects, in particular imagery of objects of interest 506, that are superimposed into their VR view. In this example, the bus 506 is provided with shading to distinguish it from other object in the VR view.

It will be appreciated that the visual effect is not limited to shading of the imagery of the object of interest. In one or more examples, a colour of the imagery of the object of interest is different to how it was presented to the first user. For example, a hue changing effect may be applied to the imagery of the OOI or the surface imagery of a model. In one or more examples, an outline of the imagery of the object of interest may be applied to "highlight" the imagery of the object of interest as a viewing experience of another user. In one or more examples, the virtual reality view of the second virtual reality content surrounding the imagery of the object of interest may be displayed differently to how it was presented prior to display of the imagery of the object of interest. For example, while the second user continues to be "present" in the second virtual reality space, the imagery thereof may be temporarily blurred or colour changed (or other visual effect) at least during a portion of the time the imagery of the object of interest is displayed. The visual effect may thereby enable the second user to distinguish between an object appearing in the second virtual reality content and imagery of an object of interest that is displayed based on the first-user-viewing-experience information.

Figure 7:
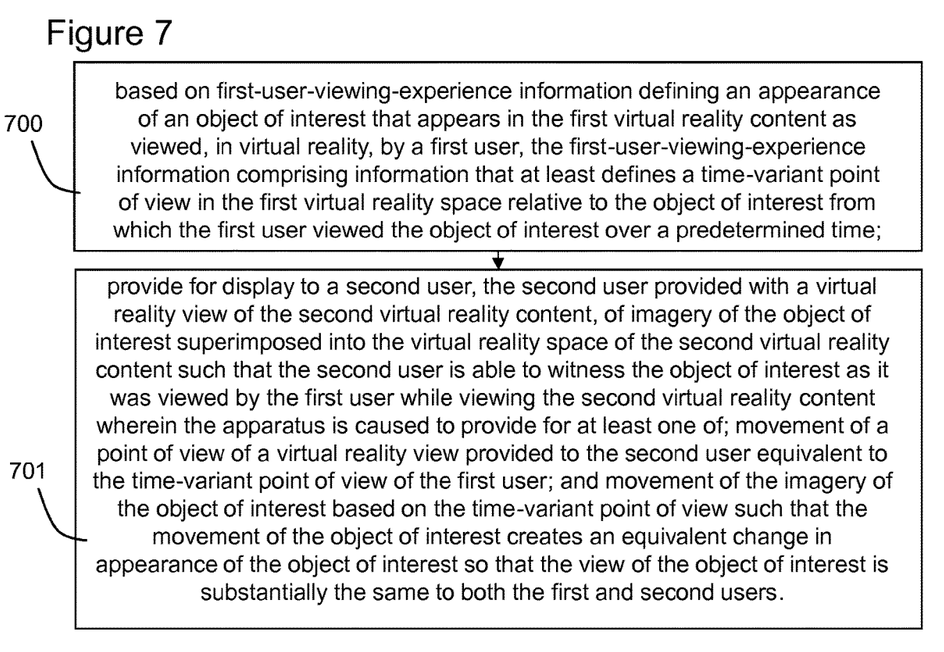
FIG. 7 shows a flowchart illustrating an example method.

FIG. 7 shows a flow diagram illustrating the steps of, in respect of first and second virtual reality content each configured to provide imagery for a respective first and second virtual reality space for viewing in virtual reality; and based on 700 first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a predetermined time; providing 701 for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the predetermined time.

Figure 8:
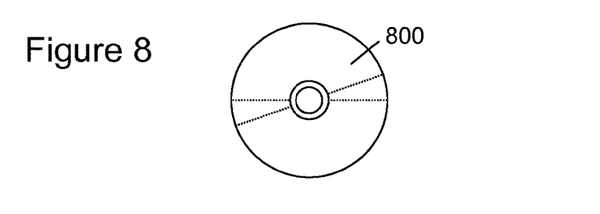
FIG. 8 shows a computer readable medium.

FIG. 8 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
      with respect to first virtual reality content and second virtual reality content, each configured to provide imagery for a respective first virtual reality space and a second virtual reality space for viewing in virtual reality, and
      based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a duration of time,
      provide for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the duration of time.

2. An apparatus according to claim 1, wherein the apparatus is caused to provide for display of the object of interest with an appearance consistent with the information that defines the time-variant point of view by at least one of:
   movement of a point of view of a virtual reality view provided to the second user equivalent to the time-variant point of view of the first user; or
   image manipulation of the imagery of the object of interest based on the time-variant point of view such that the image manipulation of the object of interest creates an equivalent change in appearance of the object of interest so that the view of the object of interest is substantially the same to both the first and second users.

3. An apparatus according to claim 1, wherein the imagery of the object of interest is provided by a virtual 3-dimensional model of the object of interest rendered in the second virtual reality space based on the information that defines the time-variant point of view to thereby enable the second user to witness the object of interest as it was viewed by the first user.

4. An apparatus according to claim 1, wherein the apparatus is caused to provide for modulation of one or more of:
   movement of the point of view of the virtual reality view provided to the second user; or
   movement of the imagery of the object of interest;
   in accordance with user input of the second user, the user input configured to change one or more of a viewing direction of virtual reality view or a point of view of the virtual reality view in the virtual reality space.

5. An apparatus according to claim 1, wherein the imagery of the object of interest is isolated from background imagery appearing around the object of interest in the first virtual reality content as viewed by the first user.

6. An apparatus according to claim 1, wherein the first-user-viewing-experience information includes pose information defining the orientation of the object of interest in the virtual reality space of the first virtual reality content; and
   wherein the appearance of the object provided for display to the second user is defined by the pose information.

7. An apparatus according to claim 1, wherein the first-user-viewing-experience information further defines movement of the object of interest in the first virtual reality space at the time it was viewed by the first user over the time; and
   wherein the apparatus is caused to provide for corresponding movement, in the second virtual reality space, of the superimposed imagery of the object of interest.

8. An apparatus according to claim 1, wherein the first-user-viewing-experience information further defines object-appearance changes of the object of interest over the time, the object-appearance comprising changes to one or more of the shape, size, color, outline, texture or configuration; and
   wherein the apparatus is caused to provide for corresponding object-appearance changes of the superimposed imagery of the object of interest.

9. An apparatus according to claim 1, wherein the object of interest comprises is associated with a 3-dimensional model and the imagery of the object of interest superimposed in the second virtual reality space comprises one or more of:
   a 2-dimensionsal image generated from the 3-dimensional model of the object of interest based on the information defining the time-variant point of view of the first user at the time the first user viewed the object of interest; or
   a 3-dimensional model oriented in the second virtual reality space in accordance with the information defining the time-variant point of view such that the second user views the object of interest from the same point of view as the first user.

10. An apparatus according to claim 1, wherein the first-user-viewing-experience information includes information to at least identify a 3-dimensional model of the object of interest and visual information indicative of one or more of:
   a configuration of a mesh that defines the 3-dimensional model;

one or more graphical textures comprises images that are rendered over a surface of the 3-dimensional model; or lighting information comprising information of how the 3-dimensional model of the object of interest was illuminated in the first virtual reality space;

and wherein the imagery of the object of interest provided for display to the second user is provided by a 3-dimensional model displayed in accordance with the visual information.

11. An apparatus according to claim 1, wherein when the imagery of the object of interest is provided for display to the second user the apparatus is caused to provide for a visual effect to be applied such that one or more of:

a colour color of the imagery of the object of interest is different to how it was presented to the first user;

shading of the imagery of the object of interest is different to how it was presented to the first user;

an outline of the imagery of the object of interest is different to how it was presented to the first user; or the virtual reality view of the second virtual reality content surrounding the imagery of the object of interest is displayed differently to how it was presented prior to display of the imagery of the object of interest;

to thereby distinguish between the second user viewing the second virtual reality content without the imagery of the object of interest and with the imagery of the object of interest.

12. An apparatus according to claim 1, wherein the first-user-viewing-experience information is generated based on one or more of:

the first user providing a user input to share how they viewed the object of interest; or a selection, by the first user, of the object of interest from one or more objects that are visible to them in the first virtual reality content.

13. A method, the method comprising with respect to first virtual reality content and second virtual reality content, each configured to provide imagery for a respective first virtual reality space and a second virtual reality space for viewing in virtual reality, and based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a duration of time, providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the duration of time.

14. A method according to claim 13, wherein the apparatus is caused to provide for display of the object of interest with an appearance consistent with the information that defines the time-variant point of view by at least one of:

movement of a point of view of a virtual reality view provided to the second user equivalent to the time-variant point of view of the first user; or image manipulation of the imagery of the object of interest based on the time-variant point of view such that the image manipulation of the object of interest creates an equivalent change in appearance of the object of interest so that the view of the object of interest is substantially the same to both the first and second users.

15. A method according to claim 13, wherein the imagery of the object of interest is provided by a virtual 3-dimensional model of the object of interest rendered in the second virtual reality space based on the information that defines the time-variant point of view to thereby enable the second user to witness the object of interest as it was viewed by the first user.

16. A method according to claim 13, wherein the apparatus is caused to provide for modulation of one or more of:

movement of the point of view of the virtual reality view provided to the second user; or movement of the imagery of the object of interest;

wherein, in accordance with user input of the second user, the user input is configured to change one or more of a viewing direction of the virtual reality view or a point of view of the virtual reality view in the virtual reality space.

17. A method according to claim 13, wherein the imagery of the object of interest is isolated from background imagery appearing around the object of interest in the first virtual reality content as viewed by the first user.

18. A method according to claim 13, wherein the first-user-viewing-experience information includes pose information defining the orientation of the object of interest in the virtual reality space of the first virtual reality content; and wherein the appearance of the object provided for display to the second user is defined by the pose information.

19. A method according to claim 13, wherein the first-user-viewing-experience information further defines movement of the object of interest in the first virtual reality space at the time it was viewed by the first user over the time; and wherein the apparatus is caused to provide for corresponding movement, in the second virtual reality space, of the superimposed imagery of the object of interest.

20. A non-transitory computer readable medium comprising program instructions stored thereon for performing at least the following:

with respect to a first virtual reality content and a second virtual reality content, each configured to provide imagery for a respective first virtual reality space and a second virtual reality space for viewing in virtual reality, and based on first-user-viewing-experience information defining an appearance of an object of interest that appears in the first virtual reality content as viewed, in virtual reality, by a first user, the first-user-viewing-experience information comprising information that at least defines a time-variant point of view in the first virtual reality space relative to the object of interest from which the first user viewed the object of interest over a duration of time, providing for display to a second user, the second user provided with a virtual reality view of the second virtual reality content, of imagery of the object of interest superimposed into the virtual reality space of the second virtual reality content such that the second user is able, while viewing the second virtual reality content, to witness the object of interest as it was viewed by the first user at least in terms of the imagery of the object of interest being provided for display with an appearance consistent with the information that defines the time-variant point of view for at least a portion of the duration of time.

\* \* \* \* \*